United States Patent [19]

Hadden

[11] Patent Number: 5,162,506
[45] Date of Patent: Nov. 10, 1992

[54] PROCESS FOR PREPARING COLLAGEN FIBERS FROM TISSUE

[75] Inventor: Ralph Hadden, Upton, Great Britain

[73] Assignee: Natural Resources (Manufacturing) Limited, Durham, United Kingdom

[21] Appl. No.: 548,893

[22] PCT Filed: Jun. 1, 1989

[86] PCT No.: PCT/GB89/00607
§ 371 Date: Jul. 25, 1990
§ 102(e) Date: Jul. 25, 1989

[87] PCT Pub. No.: WO89/11799
PCT Pub. Date: Dec. 14, 1989

[30] Foreign Application Priority Data

Jun. 1, 1988 [GB] United Kingdom ............... 8812992

[51] Int. Cl.$^5$ .................. C07K 3/02; C07K 3/12; C07K 3/28; C07K 15/20
[52] U.S. Cl. .................. 530/412; 435/273; 530/356; 530/418; 530/419; 530/420; 530/427
[58] Field of Search ............. 530/356, 412, 422, 425, 530/427, 418, 419, 420; 435/273

[56] References Cited

U.S. PATENT DOCUMENTS

| | | | |
|---|---|---|---|
| 2,290,854 | 7/1942 | Hoy | 99/169 |
| 2,721,142 | 10/1955 | Shinn et al. | 99/169 |
| 3,665,988 | 5/1972 | Aceto et al. | 146/227 |
| 4,511,583 | 4/1985 | Olson et al. | 426/89 |

FOREIGN PATENT DOCUMENTS

82/01719 5/1982 PCT Int'l Appl. .
2189492 10/1987 United Kingdom .

OTHER PUBLICATIONS

Garvoi et al., Chem. Abs. 69 (18) entry 68264u, (1968).
Soviet Inventions Illustrated, week 33, 28, Sep. 1983, Section Chemical, Abstract No. 83-740547/33, D13, Derwent Publications Ltd.

*Primary Examiner*—Merrell C. Cashion, Jr.
*Assistant Examiner*—Andrew G. Rozycki
*Attorney, Agent, or Firm*—Oliff & Berridge

[57] ABSTRACT

The invention relaates to the production of collagen fibers by comminuting collagen containing tissues, drying the comminuted product and milling the dried material while maintaining the temperature sufficiently low to prevent substantial conversion of collagen to gelatin. The collagen fiber product is particularly useful for restructuring poorly textured meats, mechanically recovered meat products, offal, fish, fish products and other protein products to improve textural properties, water retention, fat retention, eating quality, juicines, succulence, shape, size retention and protein content.

37 Claims, No Drawings

PROCESS FOR PREPARING COLLAGEN FIBERS FROM TISSUE

The present invention relates to improvements in and relating to protein products and in particular to the production of collagen fibers and to the incorporation of collagen and collagen-containing compositions into protein products.

SUMMARY OF THE INVENTION

According to the present invention there is provided a process of producing collagen fibers which comprises, while maintaining the temperature sufficiently low to prevent substantial conversion of collagen to gelatin, comminuting tissues containing collagen, drying the comminuted product, and thereafter milling the dried material.

Furthermore there is provided a process whereby the collagen fiber thus produced is added to protein products.

DESCRIPTION OF PREFERRED EMBODIMENTS

The tissues which may be used as starting material for the process of the invention include, for example, animal tissues including mammalian connective tissue, sinews, dermis (split skin or corium after removal of the outer skin layers from hide or head hide), bird skins and connective tissue, reptile skins and connective tissue, and fish skin and connective tissue. Other sources of the tissues which may be used in accordance with the invention comprise decalcificated bone dentine, and collagen-containing tissues from the cardiovascular system, synovial membrane, viscera, subcutaneous membrane, fetal dermis, vitreous humour, intervertebral discs, basement membrane, lens capsule, kidney glomeruli, placental membrane, and lung and muscle tissues. Preferred tissues include mammalian connective tissues or sinews, such as ligaments, cartilage and tendon, for example, 'Backstraps' or 'Paddi wacks' from cattle. Other preferred sources of the collagen used in the process of the invention are fish skins and the dermis of animals whose skins are usually consumed as food constituents, although bovine dermis is also a preferred source providing that its use is within the provisions of the prevailing food regulations.

The collagen fibers produced according to the present invention may also contain smaller quantities of other structural proteins, such as elastin, reticulin, connectin and desmin, and also mucopolysaccharides which are all naturally associated with collagen in varying amounts in tissues.

Preferably, residual flesh and fats are manually or otherwise removed, for example by scraping, tumble abrasion or by soaking in salts such as sodium chloride or in enzyme preparations such as papain. Soluble non-collagenous proteins and polysaccharides may be removed, if desired, along with a fraction of the soluble collagen, by soaking for example in a solution of sodium acetate, sodium dihydrogen phosphate or potassium chloride. These procedures may also serve to remove other soluble materials present, such as glycans and saponified fats. Such soluble materials may also be removed, if desired, by soaking in saturated white lime solution and thereafter removing excess calcium. Reducing the pH value to or towards the isoelectric point (pH4.6) for example to pH5.0, to provide enhanced storage stability in the treated tissue material may be desirable following treatment with salt solutions.

Animal tissues rich in collagen, such as those collected from abattoirs may conveniently be used immediately or be stored by freezing, for example at minus 20° C., or by buffering, for example in a solution of a weak acid, such as citric acid, or in citric acid and sodium citrate, at for example pH5.0, or by pickling, for example in a solution of sodium chloride and a strong acid, such as hydrochloric acid or sulphuric acid. The source of the tissues is conveniently bovine, but other collagen-containing materials, for instance materials from pigs, sheep, goats, game (including deer, eland and antelope), rabbit, hare, kangaroo, dog, monkey, camel, buffalo, horse, birds such as poultry (including chicken, duck, goose and turkey), pigeon and game birds, reptiles (including turtles and snakes), fish (including salmon, trout, eel, cod, herring, plaice, whiting, halibut, turbot, ling, squid, tuna, sardines, swordfish, dogfish, and shark), marine mammals (including whales), amphibians (including frogs), or crustacea (including shellfish, crayfish, lobster, crab, shrimps and prawns) may also be used as starting materials in the process of the invention. If pork (for example from pig achilles tendon) or chicken (for example from defeathered skin or hen neck skin rich in collagen) or turkey (for example from leg sinews) or other collagen-containing tissues are used, it is preferred that these have a low fat content. Where fat contents are particularly high then fat rendering at low temperature (for example below 60° C.) mechanically screw pressing, solvent extraction, with for example, hexane, and treatment with lipase enzymes, such as fungal lipases, may be advantageous.

It is preferred to carry out sample analyses of the cleaned tissues in order to determine the protein (particularly the collagen content), fat, moisture, calcium, ash, heavy metals, pH value, and any microbiological contamination. This is particularly preferred when the fibrous collagen produced by the process of the present invention is required to be of food grade quality.

In accordance with the present invention, the tissue material is comminuted, for example by being granulated, minced, cut, chopped, or ground through a perforated plate, for example a 6 mm perforated plate. Conveniently, the material may be fed continuously into a grinder to produce comminuted pieces, while ensuring that any temperature rise during the comminuting process is kept to a minimum. Comminuting tissues taken straight from a freezer, for example tissues which have been maintained at a temperature of minus 20° C., are preferred. It has been found convenient, for example, to arrange that the material is comminuted into pieces of about five millimeters in diameter.

If desired, the comminuted product thus obtained may be pasteurized or sterilized, or treated to retard microbial growth, for instance by treatment for a short period with dry high pressure steam, with hot fats or oils or with ultra-violet light or ionizing radiation. Precautions are preferably taken to ensure that the minimum of moisture and heat transfer occurs to the comminuted product during the pasteuriztion or sterilization. It may be advantageous to carry out sample analysis of the pasteurized or sterilized comminuted material after thorough sample mixing.

The comminuted material may be dried by using any suitable conventional drying or dehydrating means. Preferably the material is passed to the drying stage with minimum delay, and especially within a period not exceeding 24 hours. The drying may be carried out by hot-air drying procedures such as in a tray drier or band drier, or drum drier, but other hot-air driers such as tube driers, paddle or tumble driers or fluid bed driers may be employed. Microwave driers, radio frequency driers, or infra-red driers may also be used. Drying can also be carried out in vacuum driers, extruders or in freeze driers, including for instance by accelerated freeze drying and by freeze substitution. Drying may also be carried out using direct solar heating or in smoking ovens, when the product may also acquire a degree of microbial preservation and smoke flavour. The comminuted material may also be dehydrated by using fats or oils or in ethanol or other solvents.

If conventional hot-air drying of the comminuted material is employed, then the drying is preferably effected at a temperature up to and including 75° C., particularly at a temperature within the range from 35° C. to 75° C. Within this range, drying at a temperature of from 45° C. to 55° C. is especially preferred. If a tray dryer or a tube dryer is used, the drying process is advantageously carried out within 24 hours, and preferably within 12 hours and the material may advantageously be turned occasionally, and preferably continuously, to facilitate even heating and to obviate localized high temperatures. Rapid drying may be facilitated if relatively low loading densities of the comminuted material are employed, for example from 5 to 10 kilograms per square meter, with an air speed of approximately 3 meters per second, the dryer being maintained at an air temperature of approximately 55° C. and at a relative humidity of approximately 40%.

If a fluid bed drier is employed, shorter drying times are preferable, and the temperature is advantageously maintained below 75° C. and preferably below 60° C. If microwave drying, radio frequency drying, infra-red drying, solar heating, smoking, vacuum drying, extrusion, or accelerated freeze drying methods are used, the temperature is advantageously maintained below 75° C. and preferably below 60° C. If the drying is effected by dehydration in fats or oils or other solvents, then a temperature of up to approximately 120° C. may be used, with the fat or oil or other solvent acting as a moisture-expelling solvent while protecting the collagen from being converted into gelatin as well as serving to reduce protein denaturization.

During the drying process, the moisture content of the material is preferably reduced to less than 10% by weight.

The dried material is then milled in accordance with the present invention. A wide variety of conventional milling means may be employed. The use of a hammer mill or a pin mill is particularly preferred, by pinned disc mills, cross beater mills and turbo mills may be also be used. Advantageously the milling may be arranged to take place through a screen for example through a 2.5 mm, 3.0 mm or 3.5 mm perforated screen to produce a collagen fiber, or through a finer screen, for example, a perforated screen of 2.0 mm or less, to produce a finely divided collagen fiber. The product may thus have individual fiber lengths of up to 10 millimeters, preferably a fiber length within the range of from 0.1 to 5 millimeters, and especially of from 0.1 to 0.5 or from 0.5 to 5 millimeters, inclusive depending on the application. Any unground lumps passing through the screen are preferably separated and recycled through the mill.

Any rise in temperature during the milling process is preferably maintained at a minimum by careful control of the feed rate and by air cooling. However, it is particularly preferred that a coolant is added to the material undergoing the milling if there is any possibility of a substantial rise in temperature occuring. The coolant may be, for example, liquid nitrogen or solid carbon dioxide.

At all stages in the process of producing collagen fibers in accordance with the invention, the temperature is maintained sufficiently low to present substantial conversion of collagen to gelatin. Preferably the temperature is kept below a maximum temperature of 75° C.

Cyclones can be used to collect the product from the milling process, and the product may then be passed through a metal detector and weighed into polyethylene containers.

It is advantageous to carry out sample analyses of the milled product, after thorough sample mixing. A typical analysis of bovine collagen fiber produced in accordance with the present invention is as follows:

| Protein | 92% |
| Fat | 2.8% |
| Moisture | 5% |
| Ash | 0.2% |
| Arsenic | Less than one part per million |
| Lead | Less than one part per million |

A further example of a typical analysis of collagen fibers produced in accordance with the present invention is as follows:

| Protein | 85.7% |
| Fat | 2.3% |
| Moisture | 5.0% |
| Ash | 7.0% |
| Arsenic | Less than one part per million |
| Lead | Less than one part per million |

Percentages and parts stated are by weight. The protein may be collagen alone or it may contain other structural proteins naturally associated with collagen in varying amounts in animal tissues, such as elastin, reticulin, connectin, and desmin. A small amount of carbohydrate, in the form of polysaccharides naturally associated with collagen in animal tissues, may also be present. The bacterial specification of the collagen fiber is preferably that of a substantially sterile material.

The collagen content of the material produced, or the content of collagen plus the other structural proteins generally present in the material produced, is preferably at least 85% by weight on a dry weight basis, but it may be lower than this if other substances are present, for instance moisture, fat (including animal fats, vegetable oils and hydrogenated animal and vegatable oils), other proteins (including meat proteins, milk proteins, egg proteins, vegatable proteins such a soya protein, microbial proteins such as single cell proteins, and hydrolysed or autolysed vegatable or meat proteins), or other foods, food ingredients or food additives including cereals, carbohydrates such as sugars, starches, modified starches, cellulose, modified cellulose and pectins, polyhydric alcohols such as glycerol, polyethylene glycol and sorbitol, gums such a xanthan gum, alginates and tragacanth gum, salts such as sodium chloride, sodium pyrophosphate and curing salts, spices, seasonings, flavourings and colourings. These additional substances may act as dilutents, humectants, thickeners, or other functional ingredients in the meat or meat products, offals, fish or fish products or other protein products or in cosmetic or medial products, comprising the collagen fibers produced in accordance with the present invention.

The collagen fiber produced may then be added, in accordance with the present invention, to protein products. The protein product or products can comprise raw or cooked meat or meat products, offals, fish and fish products, and other protein products for food for human use, pet food, animal feed or fish food use, and also for use in cosmetic products and medical products. The addition may be made by any of a wide range of conventional mixing, adding, blending or compounding means.

Collagen fibers produced by any other method may also be added in accordance with the present invention. Such methods comprise, for instance, part extraction of collagen from animal tissues with (for example) sodium citrate buffer solution of pH 3.7 to 4.3 and reconstitution into needle-like crystalline fibers by dialysis against water or diluted salt solutions such as disodium hydrogen phosphate solution; bowl chopping, slurrying and extruding collagen containing tissues into fibers, followed by chopping and drying as required; and cell culture of collagen into formed fibers. These collagen fibers may be added by the process of the present invention to protein products such as protein products for use as food for human consumption, pet foods, animal feeds, fish food, cosmetic products and medical products.

The collagen fiber is particularly useful for restructuring poorly textured meats meat products, offals, fish, particularly comminuted fish (particularly comminuted meats), fish products, and other protein products so as to enhance their textural properties, water retention, fat retention, eating quality, juiciness, shape and size retention, or consumer appeal or to increase their meat content, fish content or protein content, or to make more cost effective products. The enhanced appeal need not be only to the human consumer, but may also have greater appeal to domestic pets when used in pet foods and to farm animals and fish when used in animal feeds and in fish foods.

Preferably collagen fiber from a particular animal species, including individual species of mammals, birds, reptiles or fish, is added to the product derived from the same species, but collagen fibers from any particular species can be added to the product derived from a different species, whether mammalian, bird, reptile or fish, and also to protein products derived from vegetable or microbial sources.

The following example illustrates the incorporation of collagen fibers in fish sticks in accordance with the present invention. 96 parts by weight of a frozen fish slurry of white fish, salmon or crab is defrosted into a paddle type mixer, and 4 parts by weight of bovine collagen fibers are streamed in while mixing. The temperature of the batch is raised to 4° C. while mixing is continued, and the batch is then immediately placed in moulds and frozen. The fish sticks thus produced contain fish and added protein (beef collagen) for ingredient labelling purposes. If fish collagen fibers are used instead of the bovine collagen fibers, then this would be included with the total fish protein content and labelled accordingly. The fish sticks may be battered and crumb coated as required, or precoated using finely divided collagen fibers and seasoned or coated with, for example, crumb, almonds, potato, dried fruit and sweet flavoured coatings.

Mechanically reocvered meat (MRM) is generally low in collagen because gristles and matrix mucopolysaccharides are not incorporated. Consequently, the addition of collagen fibers to the MRM in accordance with the present invention can bring the analysis of the product into line with that of traditional meat cuts.

Incorporation of the collagen fibers is particularly advantageous for example, in the formulation of burgers, where gristle-free meat of approximately 80% meat content can be converted into American-style burgers with excellent juiciness and retention of shape by the addition of 4% bovine collagen fibers.

The following example illustrates the incorporation of collagen fibers into beef burgers in accordance with the present invention. Raw degristled forequarter beef (40% by weight) is minced and transferred to a paddle type mixer, and bovine MRM (45% by weight) and sodium chloride (1% by weight) are added and thoroughly mixed in. Bovine collagen fibers (4% by weight) are then streamed in while further mixing, and water (10% by weight) is added and mixed in thoroughly. The temperature is raised to 4° C. and the mix is formed into any desired shape and size in pattie forming machines, and then immediately frozen. The ingredient list of the resulting beef burgers will be: beef, water and salt, and the analysis will be 100% meat.

The MRM or other poorly textured meats (especially comminuted meats), meat products, offals, fish (especially comminuted fish), fish products and other protein products can be raw, sterilized pasteurized, partly cooked or cooked before the collagen fiber is added to it in accordance with the process of the invention. However, it is preferred that the product comprising the admixed collagen fiber, subsequently to the admixture, is subjected to a cooking or heating procedure. In this way the functional properties of the collagen fibers can be fully, or substantially fully, exhibited in the product of the invention.

The use of collagen fibers in accordance with the invention is also advantageous in the production of continental-type sausages either cooked (for instance frankfurters) or cured (for instance bierwurst). Addition of the collagen fiber may thus enhance the textural properties of the sausage products and act as a binder where non-meat binders, such as soya derivatives, cannot be used because of legislation. In meat products incorporation offals, for instance hearts, the percentage incorporation of the offals may be increased and their textural properties improved by the addition of collagen fibers. Reformed meats, if formed from low-grade connective tissue products, such as raw or cooked MRM and offal, may be prepared with better cohesiveness and at lower cost by the incorporation of collagen fibers produced by the present invention. Fat retention in particular is enhanced giving improved succulence and the addition of extra lipids, for instance meat fats, may also be assisted by the presence of the incorporated collagen fibers, resulting in a further improvement in juiciness.

In binding properties, for example in reformed meat and reformed fish for foods for human consumption or for pet foods (particularly when MRM is used or when other comminuted meats or fish are used which have lost cohesiveness), incorporation of the collagen fibers can replace the addition of non-meat or non-fish materials such as wheat gluten and soya protein, which are not universally permitted in Continental style cooked meats, or of bovine plasma which cannot always be included within the officially recorded meat content of the product. At the same time, textural properties, water retention, fat retention, eating qualities, juiciness, shape and size retention, meat or fish content and/or consumer appeal may be substantially enhanced. Products formed by restructuring offal proteins or bone proteins, for example by high-temperature extrusion or by deposition (for instance into alkali), may be further improved by incorporating collagen fibers in accordance with the present invention.

Collagen fibers can be advantageously included in meat or meat products to adjust the protein to total meat ratio to meet prevailing legislation.

Meat products, fish products or other protein products which have been passed through a cooker extruder, with or without co-extrusion of pastry or potato or starches (for instance rice starch) to produce logs or coated logs of cooked products in any of a variety of shapes, may be substantially improved in as regards their textural properties, water retention, fat retention, eating quality, juiciness, shape and size retention, meat or fish content, and/or consumer appeal by the addition of collagen fibers in accordance with the present invention. Similar formed products, produced in extruders through vacuum fillers via shaped nozzles capable of substantially further compressing the product, may also be improved by the addition of the collagen fibers in accordance with the present invention.

The incorporation of the collagen fibers into the protein product can advantageously be combined with the addition of salts such as sodium chloride, sodium pyrophosphate and curing salts to enhance still further the binding properties, moisture retention or other desirable characteristics.

The incorporation of collagen fibers into meat or meat products can also be effected with advantage simultaneously with the addition of gums, preferably xanthan gum, to improve still further the textural properties and moisture retention during cooking. Such gums can be added by any of a variety of conventional means, for instance by injection, tumbling, massaging or admixing. For example, if xanthan gum is used, the gum solution preferably contains from 0.2% to 1.0% by weight of the gum.

In all the foregoing applications to which the collagen fibers of the invention can be put, the collagen fibers appear to act in two major ways. Firstly, when mixed with other proteins such as mammalian muscle proteins in an aqueous environment they swell somewhat due to hydration and, being fibrous and of optimum length, they phyisically bind the fibers of the muscle proteins together. On cooking or other subsequent heating or re-cooking, the shortening of the collagen fibers which occurs at a temperature in the range from about 55° C. to 65° C. as well as the physical presence of the collagen fibers themselves causes the eating quality of the product to be greatly improved by introducing a degree of chewiness or texture into the product, thus simulating the eating qualities of a piece of steak. Secondly, they swell at higher temperatures and become softened as they take up water and partially convert to soluble gelatin on cooking at about 70° C. to 85° C. thus causing an improvement in tenderness. At the same time, and to a greater extent on subsequent cooling, an increase in water retention and improved perceived juiciness is caused by the gelling properties of the gelatin, giving an overall improvement in size and shape retention and enhanced eating quality. At cooking temperatures above 85° C. (internal temperature) then increasing proportions of the collagen fibers are converted into soluble gelatin, thus causing a further improvement in tenderness but a reduction in the textural strength of the product.

The application of pressure while forming the products containing collagen fibers is advantageous, for instance the use of plate freezers (for example at 5 p.s.i. at −40° C.), extruders (for example at up to 25 p.s.i.) and particularly vacuum fillers under extrusion (for example at 25 to 50 p.s.i.) ideally through shaped nozzles, especially the Z-bend configuration of extrusion nozzles. This may be due to a degree of alignment of the fibers and of their layering in the most advantageous cases by the application of pressure in two directions and also to a more intimate binding of the collagen fibers and the meat or fish proteins for example under the application of the applied forces.

Collagen fibers in a finely divided state, typically with a fiber length within the range of from 0.1 to 0.5 millimeters inclusive, can be advantageously used as, or as part of, a predusting system for protein products, particularly meat products and fish products. For example, a finely divided collagen fiber (or powder) may be dusted onto a burger and heated to allow partial conversion to gelatin, for instance by passing it through a heated tunnel. Powder or granula coatings, such as spices, seasonings. flavouring, colourings, nuts, potato, dried fruit, sweet flavoured coatings and breadcrumbs, can be effectively bound to the partially gelatinized collagen coating either by mixing them with the collagen prior to the predusting stage of by adding them after partial collagen gelatinization. Thus the need to use a batter mix prior to addition of the coating is eliminated and with it the necessity to seal on the coating to prevent the migration of moisture utilizing, for example deep fat frying. Finely divided collagen fibers can also be advantageously utilized as a precoating system for protein products particularly meat and fish products and sealed by heating to allow batter coating and enrobing with coatings such as crumb, potato and nuts without the need for to further seal the product by for example deep fat frying.

The present invention comprises collagen fibers when produced by the process of the invention.

The present invention also comprises protein products containing incorporated collagen fibers when produced by the process of the invention. The protein of the products may be raw, pasteurized sterilized, part cooked or cooked meat or meat products from mammalian, bird, or reptile sources, offals, fish or fish products, including products derived from whales, krill or crustacea, or other proteins such as proteins of vegetable or microbial origin, and products made from these proteins. The following example further illustrates the present invention. Raw mechanically recovered meat (MRM) is brought up in temperature from deep frozen to 1° C. and from 1% to 6% and preferably approximately 4%, by weight of collagen fiber produced for instance by the process described in this invention is added portionwise and mixed thoroughly in a efficient blender, for example in a double arm type ribbon trough mixer. The temperature is brought up to 4° C., the preferred maximum being 5° C., and the mixture is placed on freezer trays and plate frozen. On cooking or precooking at an internal temperature of 65° C. to 100° C.

(or from 115° to 125° C. for a shorter time in a pressure cooker or retort), the collagen fibers contact and then partially convert to gelatin, thus binding the product together and improving the eating qualities. At temperatures substantially above 80° C. the binding properties of the formed gelatin may be accentuated, but the textural enhancement of the collagen fibers may be reduced. Conversion of the collagen fibers to gelatin is approximately 5% to 10% at 64° C. to 70° C., and 7% to 15% at 75° C. to 85° C. when held for a short period. At 85° C. for a prolonged period, conversion may reach 50%. At 100° C. conversion may be 10% to 20% when held for a short period, and up to 100% when held for about 4 hours. Microwave heating tends preferentially to increase the solubility of the collagen fibers relative to the muscle proteins in meat, and hence lower internal temperatures can produce levels of gelatin equivalent to that obtained by higher internal temperatures produced by conventional cooking means.

The products thus produced may be used for example as replacement mean cuts by slicing, as steaks by forming, and as Chinese stir-fry ingredients or meat lumps for canned meats, pet foods, or soups, by dicing. A similar set of products may be produced if the raw material used in the process is mechanically recovered fish, for instance from deboning processes.

In MRM and other meats and meat products and mechanically recovered fish and fish products, where the structure of the tissue has been destroyed and which on cooking is no longer able to prevent the egress of fluid released by proteins, collagen fibers can greatly increase water and lipid-holding capacities thus reducing 'shrink' where it is derived from both aqueous and fatty sources, for example in cooked meats. In such products, a further improvement in water-holding capacity may be obtained by the addition of gums, for instance xanthan gum and alginates, and of salts, for instance sodium chloride, sodium pyrophosphate and curing salts. In this manner, loss of juiciness and palatability is obviated.

The incorporation of collagen fiber into freshly prepared MRM as it emerges from the deboning machines, or after brief mixing to standardize batches, can be highly advantageous as the MRM is at the optimum temperature and its meat proteins are in the most available state to bind with the collagen fibers.

Irradiation of the collagen fibers, or of the collagen raw material, or of the protein product containing the collagen fibers, particularly of the collagen fibers produced by the process described in this invention, with sterilizing doses of ionizing radiation (such as 5M rad) may cause an increase of tenderness of the product due to a decrease in the shrink temperature of the collagen fibers.

Collagen fibers or finely divided collagen fibers can be advantageously used as carriers for flavourings, colourings and other food additives, particularly for use in meat products, fish products, and other protein products, that are cooked prior to consumption.

Collagen fibers can be advantageously used as a source of protein and of amino acids for nutritional purposes in food, pet food, and animal feed, and also in fish food, where the flotation properties of the collagen fiber in water can be combined with the flavour and colour carrying properties of the collagen fiber in the formulations of complete fish food preparations.

We claim:

1. A process for producing collagen fibers from tissues containing collagen which comprises, while maintaining the temperature sufficiently low to prevent substantial conversion of collagen to gelatin, comminuting the tissues, drying the comminuted product and milling the dried material, wherein said process produces a dried material which is at least 85% by weight fiber protein.

2. A process according to claim 1, wherein said dried material is about 85% to about 92% fiber protein.

3. A process as claimed in claim 1 in which residual flesh and fats are removed from the collagen containing tissue prior to comminution.

4. A process as claimed in claim 3 in which the residual flesh and fats are removed by scraping or by tumble abrasion.

5. A process as claimed in claim 3 in which the residual flesh and fats are removed by soaking in a sodium chloride solution or an enzyme preparation capable of removing fat.

6. A process as claimed in claim 3 in which the residual fats removed prior to comminution are removed by low temperature rendering, mechanical screw processing, solvent extraction or by treatment with lipase enzymes.

7. A process as claimed in claim 1 in which soluble non-collagenous proteins and polysaccharides are removed from the tissues prior to comminution by soaking in a solution of sodium acetate, sodium dihydrogen phosphate or potassium chloride.

8. A process as claimed in claim 1 in which soluble non-collagenous proteins and polysaccharides are removed from the tissues prior to comminution by soaking in saturated white lime solution.

9. A process as claimed in claim 1 in which the collagen containing tissue is treated by at least one method selected from the group consisting of freezing, buffering and pickling, prior to comminution.

10. A process as claimed in claim 9 in which the collagen containing tissue is buffered in a solution of citric acid and sodium citrate and pickled in a solution of sodium chloride and at least one acid selected from the group consisting of hydrochloric acid and sulfuric acid.

11. A process as claimed in claim 1 in which the collagen containing tissue is comminuted by granulating, mincing, cutting, chopping or grinding through a perforated plate.

12. A process as claimed in claim 11 in which the collagen containing tissue is fed continuously into a grinder to produce comminuted materials while maintaining the temperature of the collagen containing tissue, up to a maximum of 75° C.

13. A process as claimed in claim 11 in which the collagen containing tissues are removed directly from a freezer at a temperature of at least −20° C. prior to comminution.

14. A process as claimed in claim 10 or claim 12 in which the collagen containing tissue is comminuted into pieces of approximately 6 mm in diameter.

15. A process as claimed in claim 11 in which the comminuted product is pasteurized or sterilized or treated to retard microbial growth.

16. A process as claimed in claim 15 in which the comminuted product is treated with dry high pressure steam, with hot fats or oils, or with ultra-violet light or ionizing radiation.

17. A process as claimed in claim 1 in which the comminuted material is dried following comminution until the moisture content of said material is reduced to less than 10% by weight, provided that said drying occurs within a period not exceeding 24 hours.

18. A process as claimed in claim 17 in which the drying is performed by using tray driers, band driers, drum driers, tube driers, paddle driers, tumble driers or fluid bed driers.

19. A process as claimed in claim 17 in which the comminuted material is dried using a microwave drier, or a radio frequency drier or an infra red drier.

20. A process as claimed in claim 17 in which the comminuted material is dried using vacuum driers, extruders or freeze driers.

21. A process as claimed in claim 17 in which the comminuted material is dried using accelerated freeze drying or freeze substitution.

22. A process as claimed in claim 17 in which the comminuted material is dried using solar heating or smoking ovens.

23. A process as claimed in claim 17 in which the comminuted material is dehydrated by using at least one material selected from the group consisting of fats, oils, ethanol, and other solvents capable of dehydrating comminuted material.

24. A process as claimed in claim 17 in which the comminuted material is dried in a hot air drier at a temperature within the range 35°-75° C.

25. A process as claimed in claim 24 in which the comminuted material is dried at a temperature within a range of 45°-55° C.

26. A process as claimed in claim 1 in which the dried material is milled using a hammer mill, a pin mill, a pinned disc mill, cross beater or a turbo mill.

27. A process as claimed in claim 26 in which the milling includes the steps of passing the milled material through a screen to produce a collagen fiber.

28. A process as claimed in claim 26 in which the milled product has an individual fiber length of up to 10 mm.

29. A process as claimed in claim 26 in which the milled product has individual fiber lengths within the range 0.1 mm -5 mm.

30. A process as claimed in claim 26 in which the milled product has milled fiber lengths within the range 0.1 mm -0.5 mm.

31. A process as claimed in claim 26 in which the milled product has a milled fiber length within the range 0.5 mm -5 mm.

32. A process as claimed in claim 26 in which a coolant is added to the material to suppress any rise in temperature.

33. A process as claimed in claim 1 in which the collagen containing tissues are selected from the group consisting of animal tissues including mammalian connective tissue, sinews, dermis, bird skins and connective tissues, reptile skins and connective tissues and fish skin and connective tissues.

34. A process as claimed in claim 32 in which the collagen containing tissues are selected from the group consisting of decalcified bone dentine, collagen containing tissues from the cardiovascular system, synovial membrane, viscera, subcutaneous membrane, fetal dermis, vitreous humour, intervertebral discs, basement membrane, lens capsule, kidney glomeruli, placental membrane, and lung and muscle tissues.

35. A process as claimed in claim 34 in which the collagen containing tissues include mammalian ligaments, cartilage and tendons.

36. A process as claimed in claim 32 in which the collagen containing tissues include fish skins and the dermis of animals.

37. A process as claimed in claim 33 in which the collagen containing tissues include bovine dermis.

* * * * *